Patented May 23, 1950

2,509,084

UNITED STATES PATENT OFFICE 2,509,084

METHYLATION OF XANTHINE TO FORM CAFFEINE

William E. Decker, Melrose Highlands, Mass., assignor to Technical Specialties Company, a corporation of Massachusetts No Drawing. Application January 9, 1946, Serial No. 640,131

1 Claim. (Cl. 260—256)

The present invention relates to methylation, and more particularly to a novel methylation procedure.

For purposes of illustration, the invention will be described in its application to the methylation of xanthine to form caffeine.

As is well known, caffeine is useful as an ingredient in beverages, medicines, etc. In the past, caffeine has been obtained by extraction from tea leaves and from the leaves and berries of coffee and cocoa plants. Although considerable research has been directed to the synthesis of caffeine, so far as I am aware no commercially practicable process for this purpose has heretofore been developed. For example, the use of dimethyl sulfate as a methylating agent for xanthine gives a good yield of caffeine, but the product is toxic.

It is an object of the present invention to provide an improved methylation precedure. Another object is to provide an improved process for methylating xanthine. Still another object is to provide improvements in methods for the synthesis of caffeine.

By my process, xanthine may be methylated to form caffeine, preferably by the use of novel methylating agents and novel methylation and crystallization procedures. The xanthine may conveniently be formed by treating guanine with an acid, then the excess acid in the resulting xanthine solution may be substantially neutralized and the methylation of the xanthine may be carried out in the same solution.

As a specific example of my process, the following may be given, it being understood that this detailed procedure is for illustrative purposes only and is not to be construed in a limiting sense.

Guanine in aqueous suspension is treated with hydrochloric acid to form xanthine. The acid is supplied in amount five times that theoretically required. The excess acid in the xanthine solution is then neutralized with sodium carbonate until the pH of the solution is brought to 6.5–7.0. The xanthine may then be methylated by adding acetone and methyl acetate directly to the neutralized xanthine solution and forming caffeine in said solution.

The acetone and methyl acetate may be added separately or together. The methyl acetate is preferably supplied in the ratio of approximately 12 mols of methyl acetate to 1 mol of xanthine in the solution. The amount of acetone added is preferably approximately equal in volume to the methyl acetate.

Reducing the proportion of acetone will decrease the amount of xanthine which is methylated by a given amount of methyl acetate.

The resulting caffeine solution is primed or seeded with 0.5% by weight of methyl oxalate, calculated on the basis of the caffeine, or it may be seeded with caffeine crystals. Caffeine crystals may then be obtained by cooling the solution. The caffeine crystals so obtained are purified by fractional sublimation.

The resulting product is non-toxic synthetic caffeine suitable for human consumption.

The function of the acetone is believed to be to affect the equilibrium of the reaction in a manner that will release the methyl group from the methyl acetate for methylation, but the invention, of course, is not limited to this or any other theory.

Instead of forming xanthine by the action of hydrochloric acid upon guanine, guanine may be converted to xanthine with other known agents, for example with nitrous acid, or xanthine obtained from another source may be used in the subsequent steps of my process.

Neutralization of the excess acid in the xanthine solution of the above example may be effected by the addition of any suitable alkali, for example urea or sodium carbonate. It is sometimes preferable to use an alkali which will not form a water-soluble salt with the acid present, so that the salt formed by the neutralization reaction will not crystallize out with the caffeine. However, when the caffeine is purified by fractional sublimation, this precaution is not necessary.

Instead of recoveringng caffeine by cooling the solution, the solution may be evaporated.

Purification of the caffeine may be effected by recrystallization, but this will generally be found less advantageous than purification by fractional sublimation.

When, in the appended claims, reference is made to neutralizing the xanthine solution, I do not mean that the pH must be brought to the point of exact neutrality, but it may be, for example, one-half to one pH unit on the acid side, Another application of my novel methylation procedure is in the preparation of theobromine by methylating xanthine.

The present application is a continuation in part of my co-pending application Ser. No. 568,793, filed December 18, 1944, now abandoned.

I claim:

A process for the synthesis of caffeine which comprises converting guanine to xanthine by treatment with hydrochloric acid, and then, in the same reaction vessel and without recovering the xanthine from the resulting solution, neutralizing the excess acid to bring the pH of the solution to 6.5 to 7.0, methylating the xanthine in the resulting solution with acetone and methyl acetate, priming the resulting caffeine solution with a compound selected from the group consisting of methyl oxalate and caffeine, and separating caffeine from the solution by crystallization.

WILLIAM E. DECKER.

REFERENCES CITED

The following references are of record in the file of this patent:

Chem. Abstracts 1928, p. 1139 citing J. Prakt. Chem., vol. 118, pages 198–221 (1928).

Textbook of Organic Chemistry, by George H. Richter (1938), pages 375 and 377.